United States Patent [19]

Sager

[11] Patent Number: 5,003,537
[45] Date of Patent: Mar. 26, 1991

[54] METHOD OF TRANSMITTING DATA AT FULL BANDWIDTH WITHIN A SYNCHRONOUS SYSTEM WHEN CLOCK SKEW PLUS DELAY EXCEEDS THE CYCLE TIME

[75] Inventor: David J. Sager, Acton, Mass.

[73] Assignee: Digital Equipment Corporation, Maynard, Mass.

[21] Appl. No.: 369,768

[22] Filed: Jun. 22, 1989

[51] Int. Cl.$^5$ .............................................. H04L 7/00
[52] U.S. Cl. ..................................... 375/10; 375/111; 371/1; 307/601; 307/602
[58] Field of Search .................. 375/106, 107, 111, 10; 371/1, 20.1, 28; 307/601, 602, 591; 328/72, 129.1

[56] References Cited

U.S. PATENT DOCUMENTS 4,811,364  3/1989  Sager et al. ......................... 375/106
4,839,907  6/1989  Saneski ................................ 375/113
4,847,867  7/1989  Nasu et al. .......................... 375/106
4,873,703  10/1989 Crandall et al. ..................... 375/106

Primary Examiner—Benedict V. Safourek
Assistant Examiner—Young T. Tse
Attorney, Agent, or Firm—Kenyon & Kenyon

[57] ABSTRACT

The invention expands the period of data stabilization between state devices to be 1.5 times the cycle time minus the clock skew. The invention requires that a clock signal (hereinafter "forwarded clock") be sent with data to the receiving subsystem. Such data is received by a capture latch, which is operated by special logic that receives the forwarded clock, and then proceeds to an ordinary state device in the receiving subsystem that is running synchronously with the receiving subsystem. This state device nominally captures the data 1.5 cycles after it was sent from a state device in the sending subsystem.

12 Claims, 4 Drawing Sheets

METHOD OF TRANSMITTING DATA AT FULL BANDWIDTH WITHIN A SYNCHRONOUS SYSTEM WHEN CLOCK SKEW PLUS DELAY EXCEEDS THE CYCLE TIME

FIELD OF THE INVENTION

This invention relates to a digital computer system and, more particularly, to a synchronous digital computer system, in which data is transmitted between state devices or subsystems. The invention provides a method that insures that data transmitted between devices or subsystems can be captured by providing that the valid window of time to transmit the data may be up to 1.5 times the system clock cycle time minus the clock skew.

BACKGROUND OF THE INVENTION

In a synchronous computer system, data is transmitted between latches, registers, other state devices or other subsystems. If the data can potentially change every cycle, the system is called "full bandwidth". In prior synchronous computer systems, the time available to transmit full bandwidth data between devices does not exceed one cycle time minus the clock skew.

In very fast cycle time synchronous computer systems, the one cycle time minus the clock skew window may be inadequate to cover the delay in the data path between devices. In such systems, proper operation cannot be guaranteed. Thus, there is a need to successfully address and solve the problem of transmitting data in high speed synchronous computer systems.

SUMMARY OF THE INVENTION

The present invention provides a means by which data can be successfully transmitted between two devices in a synchronous computer system operating at shorter system cycle times than conventional means would allow.

Generally, the invention comprises a synchronous computer system which further comprises various interconnected devices. Such devices may be state devices, such as latches or registers, or subsystems located on different modules.

The method which the invention utilizes to maintain integrity in data transmission between devices is to require the sending device to forward a clock with the transmittal data and require that both the forwarded clock and data arrive at the receiving device with approximately the same delay. The transmittal data is received by a capture state device, which is operated by special logic that receives the forwarded clock, and then proceeds to a second state device in the receiving subsystem that is running synchronously with the receiving subsystem. The second state device nominally captures the data 1.5 cycles after it was sent from a state device in the sending subsystem.

For a better understanding of the above and other features and advantages of the invention reference should be made to the following detailed description of the invention and to the accompanying drawing.

DETAILED DESCRIPTION

Figure 1:
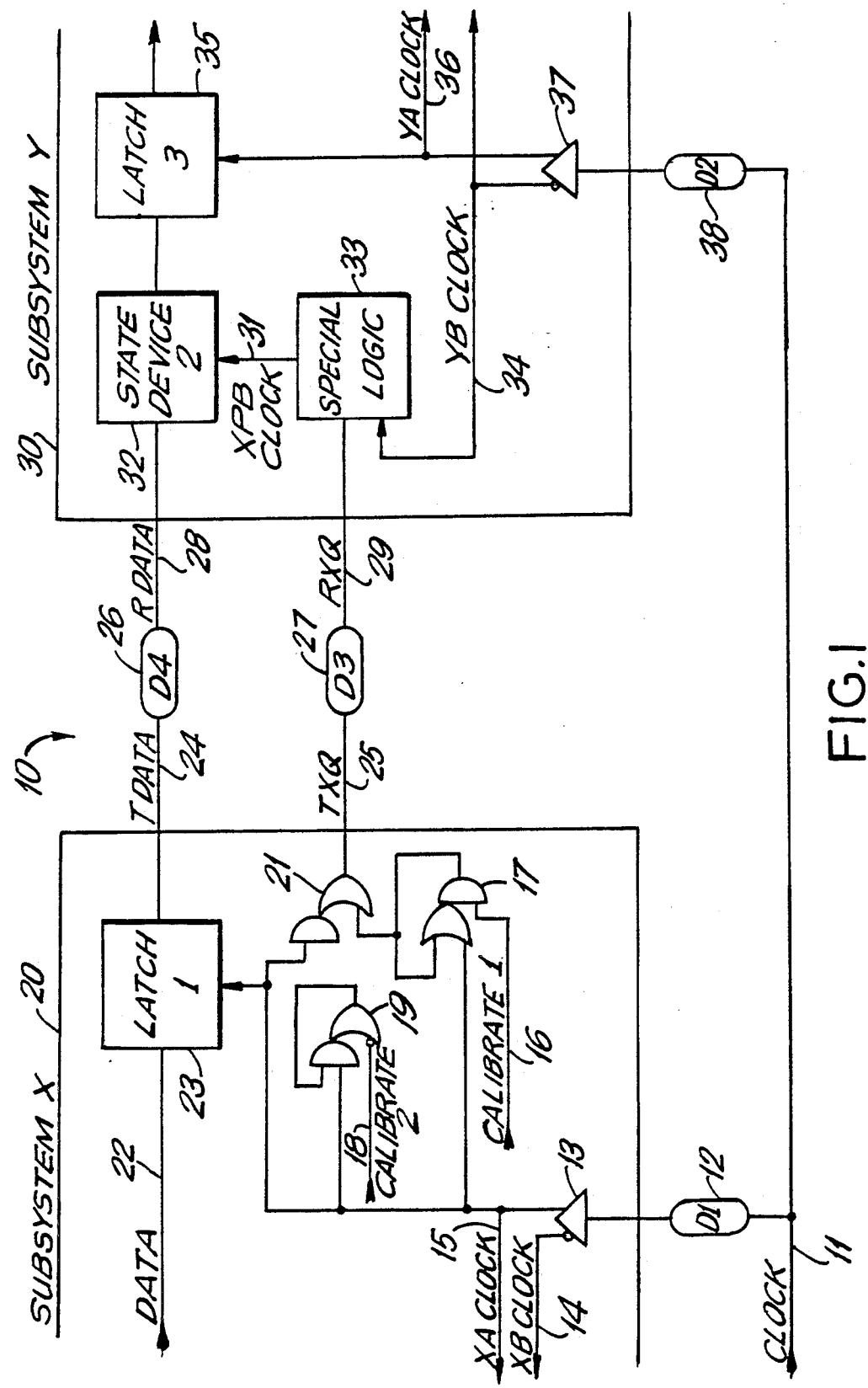
FIG. 1 is a block diagram of a computer system in accordance with the invention.

Referring now to the drawings and initially to FIG. 1, there is illustrated, in block diagram form, the system configuration according to the invention. The system 10 comprises two subsystems referred to as subsystem X 20 and subsystem Y 30. Subsystem X 20 is further referred to as the sending subsystem, and subsystem Y 30 is further referred to as the receiving subsystem. Subsystem X 20 sends data and a clock to subsystem Y 30.

Subsystem X 20 comprises a latch 23, two AND-OR gates 19 and 21, an OR-AND gate 17, and a driver 13 which are responsible for sending data and the clock, respectively, to subsystem Y 30. The latch 23 is the state device which is clocked by XA CLOCK 15 and is the sending device for data 22.

The system clock 11 is coupled to subsystem X 20 via an unknown delay, D1 12, through the differential driver 13. The inverted output of the driver 13 is XB CLOCK 14 which is utilized in subsystem X 20. The other output, XA CLOCK 15, is coupled to the inputs of the two AND-OR gates 19 and 21, the OR-AND gate 17, and the clock input of the sending latch 23. XA CLOCK 15 is used to transmit the data 22 by capturing it in latch 23 and generate the forwarded clock TXQ 25 through the combination logic with signals CALIBRATE 1 16 and CALIBRATE 2 18. Both the transmitted data TDATA 24 and the transmitted forwarded clock TXQ 25 are coupled to subsystem Y 30 through unknown delays of D4 26 and D3 27 respectively. As seen by subsystem Y 30, these signals are referred to in FIG. 1 as RDATA 28 and RXQ 29.

Subsystem Y 30 consists of a driver 37, a latch 35, a state device 32 and special logic device 33 that will be described in more detail below. The state device 32 receives the data, RDATA 28, sent from the sending subsystem X 20. The system clock 11 is coupled to subsystem Y 30 via an unknown delay of D2 38 through the differential driver 37. The inverted output of the driver 37, YB CLOCK 34, is coupled to the special logic 33 and is available to the rest of subsystem Y 30. The other output of the driver 37, YA CLOCK 36 is coupled to the clock input of latch 35 and is also available to the rest of subsystem Y 30. State device 32 is driven by XPB CLOCK 31 which is provided by the special logic device 33 as a derivative of the RXQ CLOCK 29 sent from subsystem X 20 and the local YB CLOCK 34. The RXQ CLOCK 29 is input to the special logic device 33, whose output is the XPB CLOCK 31. Latch 35, which receives the output of latch 32, is driven by nominally the same clock that drives latch 23 in subsystem X 20, but skewed due to the unknown delays D1 12 and D2 38.

Accordingly, the present invention provides for the transfer of data from latch 23 in subsystem X 20 to latch 32 in subsystem Y 30. The clock, similar to the one that clocks latch 23, is forwarded along a path similar to the data path to subsystem Y 30 and is used to clock latch 32 as shown in FIG. 1. For this system, CLOCK 11 is a symmetrical square wave. The data then proceeds to latch 35 which is clocked by the YA CLOCK 36 in subsystem Y 30. Thus, the data has now been synchronized to subsystem Y 30.

The state device 32 first captures RDATA 28 from subsystem X 20 on the falling edge of RXQ 29. The falling edge of RXQ 29 comes from the falling edge of TXQ 25. TDATA 24 changes when latch 23 opens which occurs at the same time as the rising edge of TXQ 25. In normal operation the signals CALIBRATE 1 16 and CALIBRATE 2 18 are deasserted so TXQ 25 is logically identical to XA CLOCK 15 which opens latch 23 when high. Thus, the falling edge of TXQ 25 is one half cycle after TDATA 24 changes and also one half cycle before TDATA 24 will change again. The condition which must be met for RDATA 28 to be correctly captured by state device 32 is $$|D3-D4| < \text{system clock period}/2.$$

This inequality is quantitatively what is meant by the expression the "forwarded clock path having approximately the same delay as the data transmission path."

At some time data 22 is loaded in latch 23 at the leading edge of an XA CLOCK 15 pulse which came from some CLOCK 11 edge E. This data 22 will be captured in latch 35 at the trailing edge of a YA CLOCK 36 pulse. Such pulse is generated by a CLOCK 11 edge one and one half cycles later than CLOCK 11 edge E. Thus, the condition which the system must meet is set forth by the following equation:

$$D1+D4 < D2+1.5 \times \text{system clock period}$$

In general, state device 32 does not pass data before the rising edge of RXQ 29. The rising edge of RXQ 29 comes from the rising edge of TXQ 25 which occurs at the same time TDATA 24 changes. To meet this condition the following equation must be satisfied:

$$D1+D3 < D2+1.5 \times \text{system clock period}$$

The above three inequalities describe the performance of the invention. The following equations describe the conditions that would exist using conventional transmission techniques to transfer data from latch 23 to latch 35.

$$D1+D4 < D2+1.0 \times \text{system clock period}$$

$$D1+D4 > D2$$

The advantage of the invention is that additional time of one half the system clock period is available to transport the data. Also, a minimum delay requirement in the data path is virtually eliminated.

Figure 2:
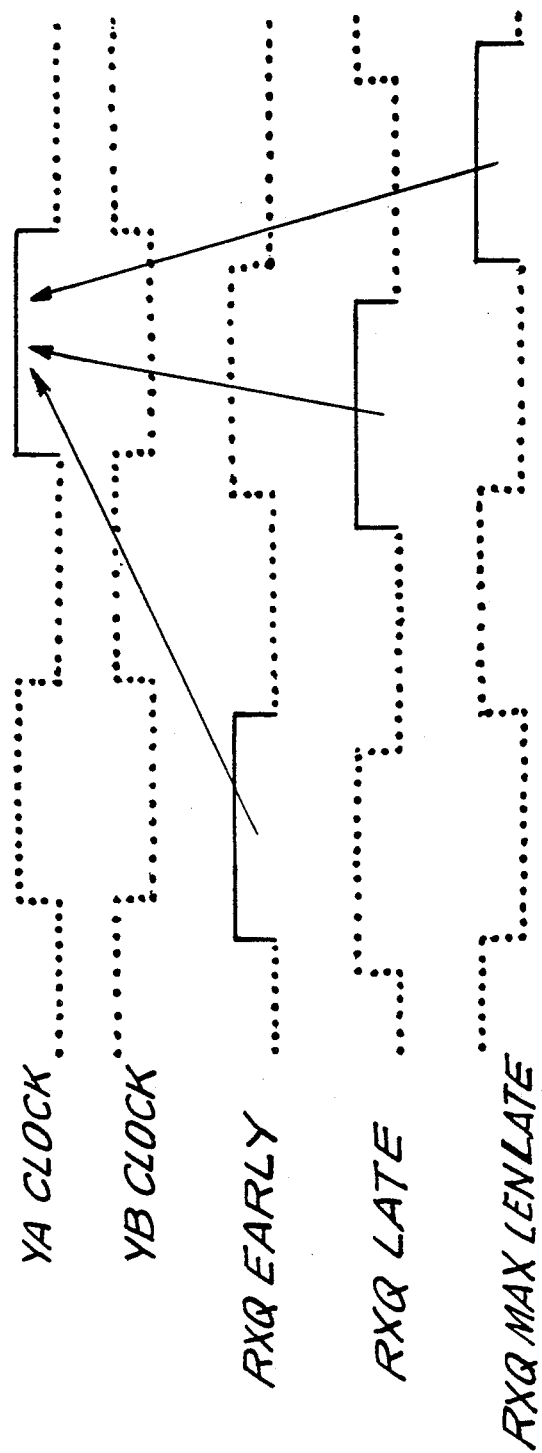
FIG. 2 is a timing diagram which illustrates system clock skew.

Referring now to FIG. 2, the waveforms encountered in the apparatus of FIG. 1 are presented. All waveforms in FIG. 2 are as seen within subsystem Y 30. The YA CLOCK 36 is a symmetrical square wave as was previously indicated. YB CLOCK 34 is the inverse of YA CLOCK 36 as can be seen in FIG. 1. Next appear three versions of the waveform of signal RXQ 29.

RXQ EARLY represents the earliest arrival time of RXQ 29 that the apparatus can correctly handle. It shows the edges of RXQ 29 slightly preceding the edges of YA CLOCK 36 that came from the same clock edges. This situation could occur if D1 12 and D3 27 are small, but D2 38 is relatively large.

RXQ LATE represents a case where an edge of RXQ 29 is seen much later than a YA CLOCK 36 edge that came from the same clock edge. This would occur if D1 12 plus D3 27 were larger than D2 38. The apparatus will work correctly in this situation.

RXQ MAX LEN LATE represents the latest arrival time of RXQ 29 for which the apparatus can work correctly. This occurs as D1 12 plus D3 27 approaches D2 38 plus one and one half cycle times.

In each of the three cases data that is accompanying the darkened RXQ pulse is captured in latch 35 when it is opened by the darkened pulse of YA CLOCK 36. This is emphasized by the arrows.

The RXQ LATE signal is almost the same signal as the RXQ EARLY signal. In fact there is a condition under which the apparatus must work correctly with RXQ 29 just a little later than RXQ LATE in which the waveform is identical to RXQ EARLY. It is impossible to tell these situations apart in subsystem Y 30 using only RXQ 29. But as the arrows emphasize, something quite different must happen in the two situations. This is because the time of arrival of RXQ 29 relative to YA CLOCK 36 and YB CLOCK 34 covers a range of well over a full system period, in fact, over 1.5 system clock periods.

If the full range of possible RXQ 29 arrival times was restricted to be less than a system period there would be no ambiguity. If, for example, RXQ EARLY was the earliest arrival of RXQ 29 that would be considered and RXQ LATE was the latest that would be considered (RXQ MAX LEN LATE would not be allowed) then it would be clear from which RXQ 29 pulse data should flow to latch 35 to be captured during the darkened YA CLOCK 36 pulse, for any allowed RXQ 29 arrival time.

The invention operates by establishing a number of cases. For each such case there is a range of arrival times of RXQ 29 relative to YA CLOCK 36 and YB CLOCK 34 that is less than a system period in width but approach a system period in width, and a behavior for the special logic 33 of FIG. 1 that will make the system work correctly for the specified range of RXQ 29 arrival times. Collectively all the cases cover the complete range of RXQ 29 arrival times from RXQ EARLY to RXQ MAX LEN LATE shown in FIG. 2. There is a great deal of overlap in the ranges of arrival times for which various cases will work correctly. This is so that given any specific RXQ 29 arrival time in the range between RXQ EARLY and RXQ MAX LEN LATE, there is a case that not only includes this arrival time in its range of correct operation, but does so with considerable margin. Thus, if a specific arrival time of RXQ 29 is seen in one event, a case may be chosen that will allow correct operation of the system for RXQ 29 arrival times approximating the observed event with significant provision for some difference from that observed event.

If the arrival time of RXQ 29 relative to YA CLOCK 36 is known at design time, the proper case could be chosen then. However, this does not usually occur. The invention provides a means to determine, at system initialization time, what case will be suitable and sets the logic for the corresponding behavior. The system will then continue to operate correctly even if the arrival time of RXQ 29 relative to YB CLOCK 34 drifts somewhat during operation since significant margin is provided for this as was described in the previous paragraph.

Figure 3:
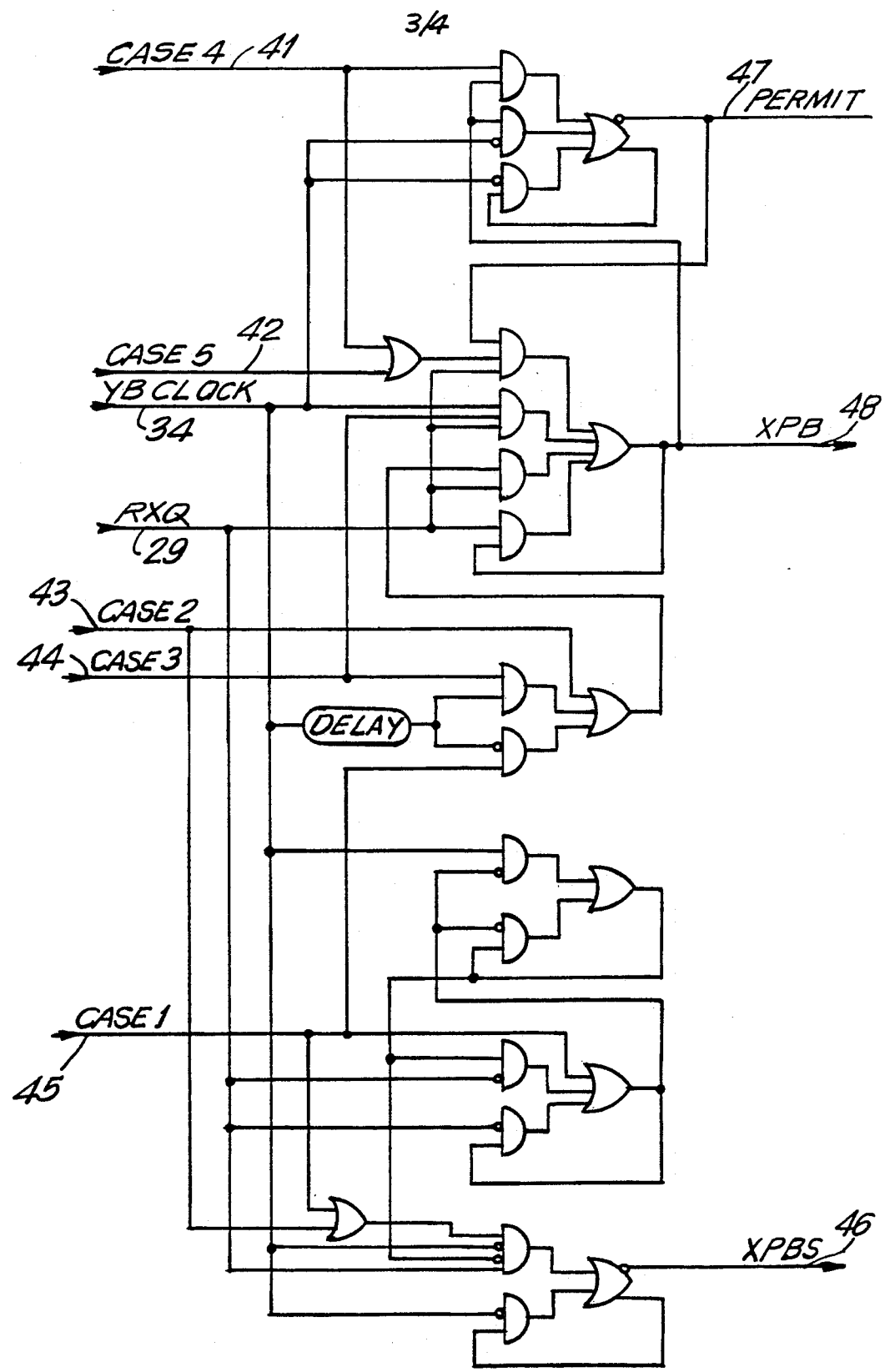
FIG. 3 is a block diagram of a first embodiment of the special logic of FIG. 1.

Referring now to FIG. 3, there is presented the logic which is one implementation of the special logic device 33 of FIG. 1. If this is used, state device 32 of FIG. 1 will be 2 latches in cascade (master and slave latches).

The master latch of state device 32 will be open when XPB 48 is asserted. The slave latch of state device 32 will be open when the signal XPBS 46 is asserted. The logic of FIG. 3 inputs RXQ 29 and YB CLOCK 34 and outputs XPB 48 and XPBS 46, together constituting XPB CLOCK 31 as shown in FIG. 1.

In FIG. 3, five signals, CASE 1 45, CASE 2 43, CASE 3 44, CASE 4 41, and CASE 5 42 are supplied by the system from a register which is not shown. This register's function is to hold the case selection. One and only one of these signals will be asserted at any given time. Case operation selection is determined at system initialization time. Once initialization is completed, the register will be loaded accordingly. The case selection will not change until the system is again initialized.

The logic of FIG. 3 was arranged so that in every "case" the opening of one of the latches (master or slave) comprising state device 32 of FIG. 1 is conditional upon the assertion of YB CLOCK 34 one half cycle before the assertion of YA CLOCK 36. This will cause latch 35 to capture the data passing through state device 32. Suppose that the entire system, other than the components shown in FIG. 1 comprises latches and combinational logic in subsystem X 20 and in subsystem Y 30. Suppose further that all latches, including latch 23, in subsystem X 20 are opened either by the assertion of XA CLOCK 15 or by the assertion of XB CLOCK 14. Suppose data presented to a latch on XA CLOCK 15 comes only from latches on XB CLOCK 14 passing through combinational logic on the way and data presented to latches on XB CLOCK 14 comes only from latches on XA CLOCK 15 passing through combinational logic on the way. Assume subsystem Y 30 is constructed analogously, all latches, including latch 35, in subsystem Y 30 are opened either by the assertion of YA CLOCK 36 or by the assertion of YB CLOCK 34. Suppose data presented to a latch on YA CLOCK 36 comes only from latches on YB CLOCK 34 passing through combinational logic on the way and data presented to latches on YB CLOCK 34 comes only from latches on YA CLOCK 36 passing through combinational logic on the way. The only exception is latch 35 which is presented data from state device 32. In this case, the entire system may be "stalled" by placing an AND gate in the XB CLOCK 14 and YB CLOCK 34 path and gating off the XB CLOCK 14 and the YB CLOCK 34 pulses. Stalling in this fashion causes the system to make no state change in the stalled cycle. The state of the system is preserved in all the "B" latches during the cycle. Because of the property described for the special logic device 33 of FIG. 3 used in FIG. 1 the system including the forwarded clock arrangement will stall correctly and resume correctly. The logic of FIG. 3 insures that one of the latches in state device 32 will hold its share of the system state during stalled cycles.

It is possible to stop the clock in the system with CLOCK 11 asserted. This means that XA CLOCK 15 and YA CLOCK 36 will be asserted and have the system operate correctly when clock transitions resume. This also means that the system of FIG. 1, using the logic of FIG. 3, will operate correctly with a clock waveform that has arbitrarily long periods when CLOCK 11 is asserted high, provided that the times when CLOCK 11 is asserted low are of the "proper duration". The periods during which the CLOCK 11 is high may not be shorter than the "proper duration". The "proper duration" gets defined at system initialization time when the operating case is selected. The case selected will depend on the clock period to be used. Furthermore, the CLOCK 11 may be stopped and restarted as described in conjunction with the method of gating off "B" clock pulses to cause stalls. Either may take place at any cycle without regard for each other provided that when the CLOCK 11 is stopped it is asserted high.

CASE SELECTION

The method for determining what case will be selected for the system to operate in is as follows. First, the running clock period that the system will operate at is determined. Next, the clock is stopped in the low state and signals CALIBRATE 1 16 and CALIBRATE 2 18 are deasserted and then CALIBRATE 1 16 is asserted. CASE 1 is selected. The clock period is set to 50% of the running period. Next, a single pulse is produced on the clock by asserting and deasserting it. The state of XPB CLOCK 31 is observed and if XPB CLOCK 31 is high, case 1 is the proper case. If XPB CLOCK 31 is low, the case operation selection continues.

The next step is to stop the clock in the low state and signals CALIBRATE 1 16 and CALIBRATE 2 18 are deasserted and then CALIBRATE 1 16 is asserted. CASE 2 is selected. The clock period is set to 75% of the running period. Next, 1.5 cycles is produced on the clock by asserting, deasserting, asserting again, and leaving the clock asserted. The state of XPBS 46 is observed and if XPBS 46 is high, case 2 is the proper case. If XPBS 46 is low, the case operation selection continues.

In this step, the clock is again stopped in the low state and signals CALIBRATE 1 16 and CALIBRATE 2 18 are deasserted and then CALIBRATE 1 16 is asserted. CASE 3 is selected. The clock period is set to 75% of the running period. Next, 1.5 cycles is produced on the clock by asserting, deasserting, asserting again, and leaving the clock asserted. The state of XPB CLOCK 31 is observed and if XPB CLOCK 31 is high, case 3 is the proper case. If XPB CLOCK 31 is low, the case operation selection continues.

For the last case operation selection step, the clock is stopped in the high state and CALIBRATE 1 16 and CALIBRATE 2 18 are deasserted and then CALIBRATE 2 18 is asserted. CASE 4 is selected. The clock period is set to 83.3% of the running period. Next, two cycles are produced on the clock by deasserting, asserting, deasserting, and then asserting it again and leaving it asserted. The state of PERMIT 47 is observed and if PERMIT 47 is high, case 4 is the proper case. If PERMIT 47 is low, then the system will operate in case 5.

Finally, CALIBRATE 1 16 and CALIBRATE 2 18 are deasserted and the determined case is selected by loading the proper value into the case selection register. The clock period is set to the proper running period. The procedure is now complete and the system is ready for normal running.

When CALIBRATE 1 16 is asserted, a single rising step is generated on TXQ 25, which propagates to RXQ 29 in response to the first rising edge of XA CLOCK 15. This first rising edge of XA CLOCK 15 comes from the first rising edge of CLOCK 11. This resulting signal is the test RXQ 29. It has the same timing as in normal operation but only a single edge so it can be located without ambiguity in the above procedure. Similarly, when CALIBRATE 2 18 is asserted, a single falling edge is generated on TXQ 25 and also on RXQ 29 in response to the first falling edge of CLOCK 11. This is used as the test RXQ 29 in some of the above described tests.

In the above procedure the actual operating logic of the system is used to measure the arrival time of RXQ 29 in subsystem Y 30. The measurement looks for actual failures in the logic of FIG. 3. There is no issue of how well the measuring device matches the operating logic, thus, there is no "measurement error."

In each step of the above case operation selection procedure the logic is comparing the arrival of the single edge of RXQ 29 with some edge of YB CLOCK 34 that was caused by a later edge of CLOCK 11 rather than the edge of CLOCK 11 that caused the test RXQ 29 edge. Each step of the procedure is done at some clock period shorter than the designated running clock period. This is done to position the YB CLOCK 34 edge earlier relative to the generation of the RXQ 29 edge in the test than it will be in normal running. The amount by which the clock period is shortened for the test is determined to have the test YB CLOCK 34 edge earlier relative to RXQ 29 edge generation by just $\frac{1}{4}$ of the clock period in all cases than would be the case in normal running. For example, in test 1 the RXQ 29 edge is generated by the initial assertion of CLOCK 11 and the test YB CLOCK 34 edge comes from the deassertion of CLOCK 11 just one half period later. Thus, the clock period is set to one half the normal value. In the last test, the test RXQ 29 edge comes from the first deassertion of CLOCK 11 while the test YB CLOCK 34 edge comes from the last assertion of CLOCK 11 1.5 cycles later. One and one half periods minus 83.3% of 1.5 periods is $\frac{1}{4}$ periods.

To ensure that RXQ 29 does not arrive too early for correct operation in case 1, the following equation must be satisfied:

$D1 + D3 > D2 -$ clock period/2Maxdelta+Maxdelay

This condition must be met by the design. The following equation must be satisfied for case 1 to work:

$D1 + D3 < D2 +$ clock period/2 $-$ Mindelta + Mindelay

Case 2 requires the following equations to be satisfied:

$D1 + D3 > D2 -$ Mindelta $D1 + D3 < D2 +$ clock period $-$ Maxdelta

For case 3, the following conditions must be satisfied:

$D1 + D3 > D2 +$ Maxdelta $D1 + D3 > D2 -$ Mindelta + Maxdelay $D1 + D3 < D2 +$ clock period $-$ Maxdelta + Mindelta For case 4, the following conditions must be satisfied:

$D1 + D3 > D2 +$ clock period/2 $-$ Mindelta $D1 + D3 < D2 + 3/2*$ clock period $-$ Maxdelta For case 5, the following conditions must be satisfied:

$D1 + D3 > D2 +$ clock period/2 $+$ Maxdelta $D1 + D3 < D2 + 3/2*$ clock period

This last condition must be ensured by the design.

Mindelta is the minimum value and Maxdelta is the maximum value of some delay through the logic of FIG. 3.

It can be seen that the overlaps in regions of correct performance are as follows:
Case 1 — Case 2
clock period/2 + Mindelay
Case 2 — Case 3
clock period $- 2*$ Maxdelta
or
clock period $-$ Maxdelta + Mindelta $-$ Maxdelay
Case 3 — Case 4
clock period/2 $-$ Maxdelta + Mindelta + Mindelay
Case 4 — Case 5
clock period $- 2*$ Maxdelta Assuming that Mindelta and Maxdelta are less than $\frac{1}{4}$ of the clock period, then all overlaps will be at least as big as $\frac{1}{2}$ of the clock period provided that the delay in FIG. 3 is chosen so that:
Mindelay > Maxdelta $-$ Mindelta
and
Maxdelay < clock period/2 $-$ Maxdelta + Mindelta.

This last constraint is difficult to satisfy if Maxdelta approaches $\frac{1}{4}$ of a clock period but is easily met if Maxdelta is much less than $\frac{1}{4}$ of a clock period. The delay of FIG. 3 may be made of gates similar to the gates forming the logic of FIG. 3 and on the same chip. This will help the delay in the delay device so constructed to correlate well with the delay of the logic in FIG. 3 which is Maxdelta and Mindelta. This facilitates getting a delay value that satisfies the above constraints.

Henceforth it is assumed that Mindelta and Maxdelta are less than $\frac{1}{4}$ of the clock period and that the delay in FIG. 3 has been made to satisfy the above constraints. Then all overlaps are at least as big as $\frac{1}{2}$ of the clock period.

The above procedure that is used at system initialization time, by virtue of performing tests at shorter clock pulse widths than what will be used in running, establishes the following conditions. If case 1 is selected, the RXQ 29 pulse during the test must have arrived at least $\frac{1}{4}$ of the running clock period earlier than the latest arrival for which case 1 would work correctly under running conditions. Conversely, if case 1 was not selected, the arrival time of the test RXQ 29 was later than $\frac{1}{4}$ of the clock period earlier than the latest arrival for which case 1 would work correctly under running conditions. Since the overlap between the correct operating ranges of case 1 and of case 2 is at least $\frac{1}{2}$ of the clock period, it follows that the arrival of the test RXQ 29 was later than $\frac{1}{4}$ of the clock period after the earliest arrival time for which case 2 would work correctly under running conditions.

Under the same procedure, if case 2 was selected RXQ 29 arrives at least $\frac{1}{4}$ of the clock period earlier, under running conditions, than the latest arrival for which case 2 will work correctly. If case 2 was not selected then RXQ 29 arrives at least $\frac{1}{4}$ of the clock period later than the earliest arrival for which case 3 works correctly. If case 3 was selected, RXQ 29 arrives at least $\frac{1}{4}$ of the clock period earlier than the latest arrival for which case 3 works correctly, and if case 3 was not selected, RXQ 29 arrives at least $\frac{1}{4}$ of the clock period later than the earliest arrival for which case 4 works correctly. Finally, if case 4 is selected RXQ 29 arrives at least $\frac{1}{4}$ of the clock period earlier than the latest arrival for which case 4 works correctly, and if case 4 is not selected RXQ 29 arrives at least ¼ of the clock period after the earliest arrival for which case 5 will work correctly.

The procedure described above determines which case to operate in to provide that if RXQ 29 in operation, due to changes in delays in the system, should arrive as much as ¼ of the clock period earlier or later than the test RXQ 29, the system will still operate correctly. The system may be operated correctly at an arbitrarily long clock period, including proper operation of stalling by means of gating off "B" clocks and stopping and starting the clock as previously described, provided the above described procedure is used to determine the correct case for operation at the designated long clock period.

Figure 4:
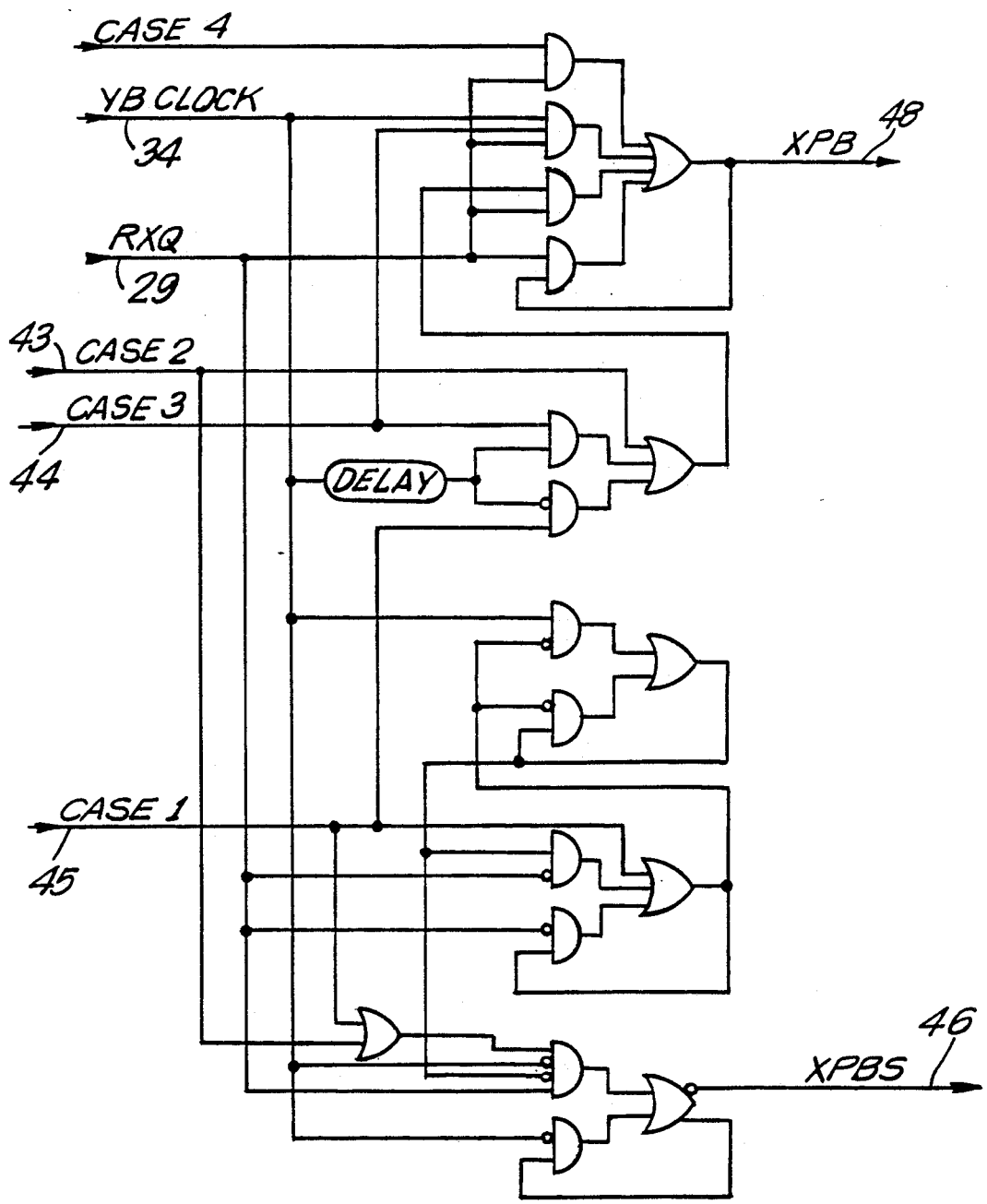
FIG. 4 is a block diagram of a second embodiment of the special logic of FIG. 1.

As was previously described, the logic of FIG. 3 was specifically designed to make stalling the system by means of gating off "B" clocks work correctly. If this feature is not required some simplification can be achieved. FIG. 4 presents a second embodiment for the special logic device 33 of FIG. 1 which is simpler than FIG. 3 because it does not include the stall feature.

If the logic of FIG. 4 is employed, there are only four cases instead of five with the logic of FIG. 3. The same procedure given above may be used to determine at system initialization time which case to operate in, except that the last test is not used and, if the last remaining test does not indicate that case 3 should be used, then case 4 should be used.

In general, if the logic of FIG. 4 is employed, stalling by gating "B" clocks off does not work. The clocks may be stopped and the system will resume correctly but only if the clocks are stopped with CLOCK 11 low (XA CLOCK 15 and YA CLOCK 36 unasserted). In general, the system will not resume correctly if the clocks are stopped in the other phase. The system will work correctly with an arbitrarily long clock period provided that the test procedure is used to select the correct case to run in with the designated long running clock period.

If it can be determined at design time approximately what the arrival time of RXQ 29 relative to YB CLOCK 34 in subsystem Y 30 is, i.e., D1 12, D2 38, D3 27, and D4 26 are known approximately, then it may be possible to determine at design time that certain cases of the logic in either FIG. 3 or FIG. 4 will not be needed. In this case the logic of FIGS. 3 or 4, as desired, may be subsetted to leave out the unneeded cases. This can provide a useful simplification of that logic. Also note that in FIGS. 3 and 4, XPBS 46 is always asserted unless the selected case is 1 or 2. Thus, if it can be established that cases 1 and 2 are not needed, state device 32 in FIG. 1 may be only a simple latch instead of a master and slave. Such advanced elimination of logic can provide a useful savings and simplify system operation.

The above described preferred embodiment of the invention is meant to be representative only, as certain changes may be made therein without departing from the clear teachings of the invention. Accordingly, reference should be made to the following claims which alone define the invention.

What is claimed is:

1. A method for accurately transmitting a series of data items between a first system and a second system, each of the first and second systems being coupled to a clock signal having a cycle time, wherein the clock signal is skewed between the first and second systems and the clock signal skew plus data transmission time exceeds the cycle time of the clock signal, comprising the steps of:
   (a) transmitting the data items as a direct function of the clock signal in the first system along a data path coupling the first system to the second system;
   (b) coupling the data path to an input of a first state device in the second system, an output of the first state device being coupled to an input of a second state device in the second system;
   (c) generating a forwarded clock signal along a clock path to a calibration logic device in the second system, an output of the calibration logic device being coupled to a clock port of the first state device;
   (d) calibrating the forwarded clock signal in the calibration logic device to account for the clock signal skew between the first system and the second system;
   (e) capturing the data items in the first state device in the second system as direct function of the calibrated clock signal; and
   (f) enabling the second state device to capture the data items on the output of the first state device as a direct function of the clock signal in the second system.

2. The method according to claim 1 wherein paths coupling the clock signal to the first and second systems have first and second transmission time delays, D1 and D2 respectively, the clock path has a third transmission time delay, D3, and the data path has a fourth transmission time delay, D4.

3. The method according to claim 2 wherein the step of enabling the second state device to capture the data items is such that D1 plus D4 be less than D2 plus one and one half the clock cycle time.

4. The method according to claim 2 wherein the step of capturing the data items in the first state device is such that $|D3-D4|$ is less than one half of the clock cycle time.

5. The method according to claim 2 wherein the step of generating the forwarded clock signal is performed simultaneously with the generation of the data items such that D1 plus D3 is less than D2 plus one and one half the clock cycle time.

6. A digital system comprising:
   a first system, the first system comprises a first state device having an input and an output, the first system transmits data items from the output of the first state device;
   a second system, the second system comprises a second state device having an input and an output, a third state device having an input and an output and a calibration logic device having inputs and an output;
   a clock signal having a cycle time, the clock signal being coupled to the first system and the second system;
   the output of the first state device in the first system being coupled by a data path to the input of the second state device in the second system;
   the input of the calibration logic device being coupled to the clock signal;
   the output of the calibration logic device being coupled to a clock port of the second state device;
   the first system generates a forwarded clock signal as an indirect function of the clock signal and transmits the forwarded clock signal across a clock path to the calibration logic device in the second system;

the calibration logic device generates a control signal as a function of the forwarded clock signal and the clock signal in the second system;

the second state device captures the data items transmitted by the first state device across the data path as a function of the control signal;

the third state device captures the data items from the output of the second state device as a function of the clock signal in the second system.

7. The digital system of claim 6 wherein paths coupling the clock signal have first and second transmission time delays, D1 and D2 respectively, the clock path has a third transmission time delay, D3, and the data path has a fourth transmission time delay, D4.

8. The digital system of claim 7 wherein the data path and clock path are arranged such that $|D3-D4|$ is less than one-half of the clock cycle time.

9. The digital system of claim 7 wherein the second state device captures the data items such that D1 plus D4 is less than D2 plus one and one-half the clock cycle time.

10. The digital system of claim 7 wherein the relationship between the data items and the forwarded clock signal is such that D1 plus D3 is less than D2 plus one and one-half the clock cycle time.

11. A method for calibrating, at system initialization, a clock signal to insure accurate transmission of a series of data items between a first system and a second system, each of the first and second systems being coupled to the clock signal having a cycle time, wherein the clock signal is skewed between the first and second systems and the clock signal skew plus data transmission time exceeds the cycle time of the clock signal, comprising the steps of:

(a) coupling the first and second systems by a data path and a clock path;

(b) generating a forwarded clock signal in the first system across the clock path to the second system as a function of the clock signal;

(c) measuring the time differential between the arrival of a single edge of the forwarded clock signal at the second system and an edge of the clock signal in the second system which corresponds to an edge of the clock signal which is later in time than the edge of the clock signal which generated the forwarded clock signal;

(d) determining for the time differential measured in step (c) a range for the arrival of forwarded clock signals; and (e) shifting the edge of the clock signal in the second system as a function of the time differential to be earlier relative to the generation of each forwarded clock signal edge.

12. A method for calibrating, at system initialization, a clock signal to insure accurate transmission of a series of data items between a first system and a second system, each of the first and second systems being coupled to the clock signal having a cycle time, wherein the clock signal is skewed between the first and second systems and the clock signal skew plus data transmission time exceeds the cycle time of the clock signal, comprising the steps of:

(a) coupling the first and second systems by a data path and a clock path;

(b) measuring a transmission time delay relationship between first and second transmission time delays, D1 and D2, respectively, for paths coupling the clock signal to the first and second systems and a third transmission time delay, D3, for the clock path; and (c) configuring a calibration logic device in the second system in accordance with the measured transmission time delay relationship such that the second system will accurately capture the series of data items transmitted from the first system to the second system, with such capture, inpart, based on a range for an arrival of forwarded clock signals also in accordance with the measured transmission time delay relationship.

* * * * *